(12) United States Patent
Hagihara

(10) Patent No.: US 8,085,325 B2
(45) Date of Patent: Dec. 27, 2011

(54) SOLID-STATE IMAGE PICKUP APPARATUS

(75) Inventor: Yoshio Hagihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 387 days.

(21) Appl. No.: 12/489,797

(22) Filed: Jun. 23, 2009

(65) Prior Publication Data

US 2009/0316029 A1 Dec. 24, 2009

(30) Foreign Application Priority Data

Jun. 24, 2008 (JP) .............................. P2008-164203

(51) Int. Cl.
  *H04N 3/14* (2006.01)
  *H04N 5/335* (2011.01)
  *H03M 1/60* (2006.01)

(52) U.S. Cl. ........................................ 348/294; 341/157
(58) Field of Classification Search ................... 341/157
  See application file for complete search history.

(56) References Cited

U.S. PATENT DOCUMENTS

| | | | | |
|---|---|---|---|---|
| 5,073,858 | A * | 12/1991 | Mills ............................ | 600/410 |
| 7,391,353 | B2 * | 6/2008 | Suzuki ......................... | 341/155 |
| 2001/0050330 | A1 * | 12/2001 | Mattison .................... | 250/208.1 |
| 2006/0209200 | A1 * | 9/2006 | Xu ............................... | 348/294 |
| 2006/0214086 | A1 | 9/2006 | Fukushima | |
| 2007/0075888 | A1 * | 4/2007 | Kelly et al. ................ | 341/155 |
| 2007/0103356 | A1 * | 5/2007 | Makino et al. ............. | 341/155 |
| 2009/0109308 | A1 | 4/2009 | Fukushima | |

FOREIGN PATENT DOCUMENTS

JP 2006-270293 A 10/2006

* cited by examiner

*Primary Examiner* — Albert Cutler
(74) *Attorney, Agent, or Firm* — Westerman, Hattori, Daniels & Adrian, LLP

(57) ABSTRACT

A solid-state image pickup apparatus includes: an image pickup portion in which are arranged a plurality of pixels with a photo-electric conversion element, the pixels which generate and output a signal in accordance with the intensity of an incident electromagnetic wave; a frequency conversion portion that includes a link circuit in which a plurality of inversion circuits with a first terminal and a second terminal are linked in a ring, each of the inversion circuits having a varying delay time from an input signal to an output signal based on the voltage difference between the voltage supplied to the first terminal and the voltage supplied to the second terminal, and the frequency conversion portion which generate clock pulses at a frequency based on the voltage difference; a count portion which counts the clock pulses generated by the frequency conversion portion; and a transistor including: a third terminal to which is input a predetermined voltage; a fourth terminal connected to the first terminals; and a fifth terminal to which are input signals from the pixels, the transistor controlling a current that is passed between the third terminal and the fourth terminal based on a signal that is input to the fifth terminal.

3 Claims, 12 Drawing Sheets

SOLID-STATE IMAGE PICKUP APPARATUS

BACKGROUND OF THE INVENTION

1. Field of the Invention

The present invention relates to a solid-state image pickup apparatus such as a digital camera.

Priority is claimed on Japanese Patent Application No. 2008-164203 filed on Jun. 24, 2008, the contents of which are incorporated herein by reference.

2. Description of Related Art

Solid-state image pickup apparatuses using a variety of image pickup devices such as a MOS-type image pickup device and a CCD-type image pickup device have been proposed and put to practical use. Furthermore, solid-state image pickup apparatuses provided with a MOS-type image pickup device include an amplification-type solid-state image pickup apparatus. The amplification-type solid-state image pickup apparatus includes: an electric charge generation device; and a pixel signal generation device which generates a pixel signal in accordance with a signal charge generated by the electric charge generation device, in which the pixel signal generation device has pixels configured as an amplification-type solid-state image pickup device (APS, Active Pixel Sensor), each pixel having a drive transistor for amplification. Many of the (C)MOS-type solid-state image pickup apparatuses have such a configuration.

In addition, column-ADC-system solid-state image pickup apparatuses in which an A/D conversion (analog/digital) function is embedded in a column portion have also been developed and commercialized. Known A/D conversion systems include a successive approximation register (SAR) A/D conversion system, a single-slope A/D conversion system, and a cyclic A/D conversion system. Furthermore, a column-ADC (A/D Converter)-system solid-state image pickup apparatus as follows has also been proposed (for example, Japanese Unexamined Patent Publication, First Publication No. 2006-270293). In this ADC system, a column portion has a time-to-digital converter (TDC) with a function of converting voltage to frequency in accordance with a signal from a pixel. Japanese Unexamined Patent Publication, First Publication No. 2006-270293 says that it is possible to A/D-convert a signal from a pixel with comparative ease and a high S/N by use of a TDC.

SUMMARY

The present invention has an object to provide a solid-state image pickup apparatus capable of implementing a highly noise-resistant power source with an easy-to-build circuit configuration.

DETAILED DESCRIPTION OF PREFERRED EMBODIMENTS

Figure 1:
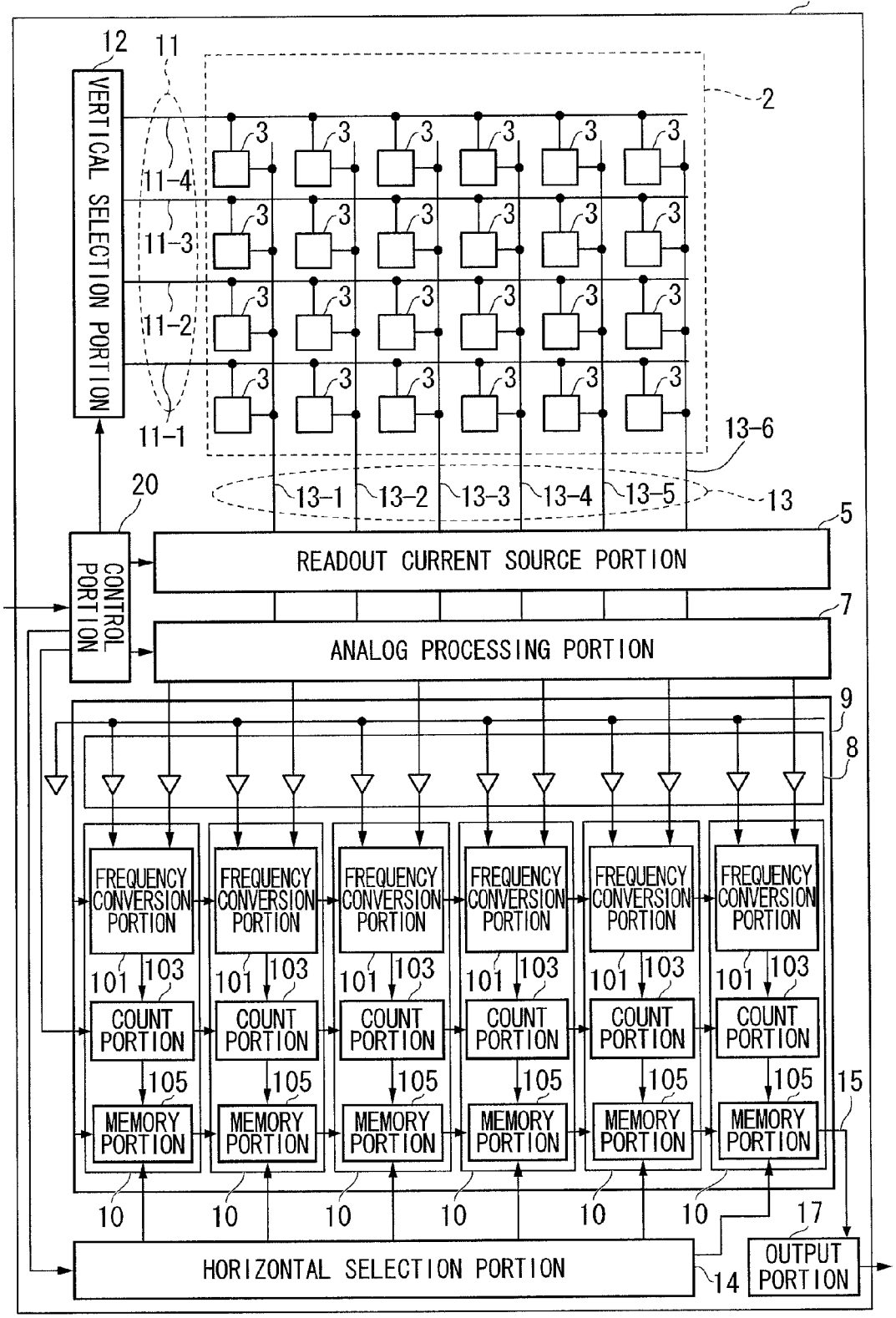
FIG. 1 is a configuration diagram showing a configuration of a (C)MOS solid-state image pickup apparatus according to one embodiment of the present invention.

Hereunder is a description of one embodiment of the present invention with reference to the drawings. FIG. 1 is a configuration diagram showing a configuration of a (C)MOS-type solid-state image pickup apparatus of the present embodiment. A solid-state image pickup apparatus 1 includes an image pickup portion 2 in which a plurality of unit pixels 3 are arranged in a matrix manner, each unit pixel 3 generating a signal in accordance with the intensity of an incident electromagnetic wave, and outputting the generated signal. The solid-state image pickup apparatus 1 further includes a vertical selection portion 12 which selects each row of unit pixels 3 included in the image pickup portion 2. The solid-state image pickup apparatus 1 further includes a readout current source portion 5 which reads a signal that is output from the image pickup portion 2 as a voltage signal. The solid-state image pickup apparatus 1 further includes an analog processing portion 7 which performs processing, such as CDS (Correlated Double Sampling) processing and clamp processing, on the voltage signal read by the readout current source portion 5. The solid-state image pickup apparatus 1 further includes an A/D conversion portion 9 that has a power supply portion 8 and column portions 10, the power supply portion 8 supplying power to the column portions 10, and the column portions 10 performing an A/D conversion in accordance with the voltage signal processed by the analog processing portion 7. The solid-state image pickup apparatus 1 further includes a horizontal selection portion 14 which selects a piece of data stored in the column portions 10. The solid-state image pickup apparatus 1 further includes an output portion 17 which outputs the piece of data selected by the horizontal selection portion 14. The solid-state image pickup apparatus 1 further includes a control portion 20 which controls the respective portions of the solid-state image pickup apparatus 1.

The image pickup portion 2 in FIG. 1 shows an example made of unit pixels 3 in four rows by six columns for the sake of simplicity. However, in actuality, tens to thousands of unit pixels 3 are arranged in every row and every column of the image pickup portion 2. Furthermore, although not shown in the figure, every unit pixel 3 constituting the image pickup portion 2 is made of: a photo-electric conversion element such as a photo diode, a photo gate, and a photo transistor; and a transistor circuit.

The unit pixels 3 are connected to the vertical selection portion 12 via vertical control lines 11 (11_1 to 11_4). Signals that are output from the unit pixels 3 are connected to the readout current source portion 5 and the analog processing portion 7 via vertical signal lines 13 (13_1 to 13_6).

Figure 2:
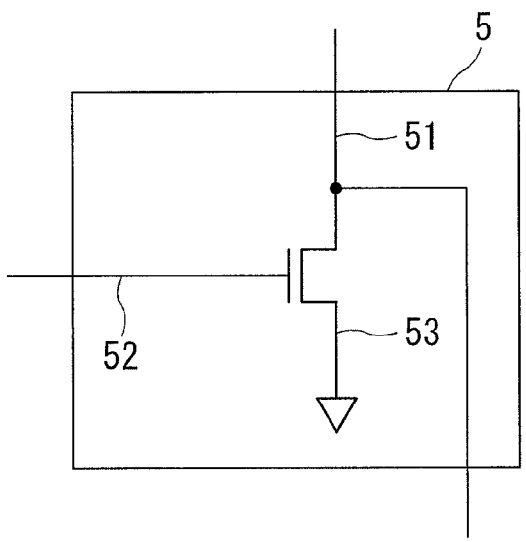
FIG. 2 is a circuit diagram showing a circuit of the readout current source portion in the embodiment.

FIG. 2 is a circuit diagram showing one example of readout current source portion 5 in the present embodiment. The readout current source portion 5 is configured using an NMOS transistor. To a drain terminal 51, the vertical signal line 13 from the image pickup portion 2 is connected. To a control terminal 52 (gate terminal) is appropriately applied a desired voltage. A source terminal 53 is connected to a GND (ground). As a result, a signal from the pixel 3 is output as a voltage mode. In the example shown, the description is for the case where the readout current source portion 5 is configured using an NMOS transistor. However, the configuration is not limited to this.

Figure 3:
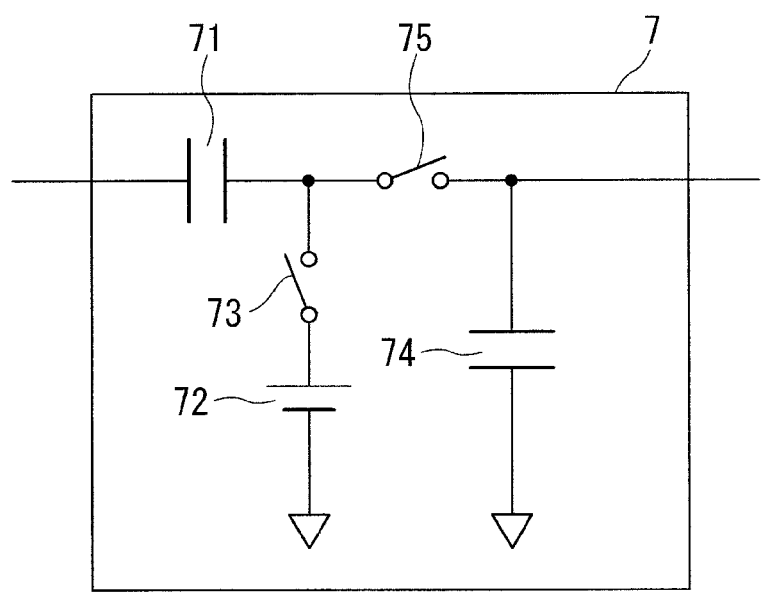
FIG. 3 is a circuit diagram showing a circuit of the analog processing portion in the embodiment.

FIG. 3 is a circuit diagram showing one example of a circuit of the analog processing portion 7 in the present embodiment. The analog processing portion 7 has a CDS processing mechanism as a noise removal device. The analog processing portion 7 includes a clamp capacitor 71 (Cclp), a clamp switch 73 (SW_clp), a sample-hold capacitor 74 (Csh), and a sample hold switch 75 (SW_sh).

The clamp capacitor 71 (Cclp) is connected to the vertical signal line 13. The clamp switch 73 (SW_clp) clamps the clamp capacitor 71 on a clamp bias 72 (Vbias). The sample hold capacitor 74 (Csh) sample-holds a signal.

In performing CDS processing, the analog processing portion 7 performs difference processing, on a pixel signal in voltage mode that has been input via the vertical signal line 13, between a signal level immediately after the pixel reset (a reset level) and an actual signal level, based on two pulses: a clamp pulse (CLP) and a sample pulse (SH) that are provided from the control portion 20.

As a result, an FPN (Fixed Pattern Noise), which is a fixed variation for each pixel, and a noise component called a reset noise are removed. In addition to the CDS processing function, the analog processing portion 7 may further include: an AGC (Auto Gain Control) circuit with a function of amplifying a circuit signal; and other processing functions, as required.

Returning to the description of FIG. 1, the A/D conversion portion 9 includes a power supply portion 8 and column portions 10. The power supply portion 8 supplies a voltage to a frequency conversion portion 101 included in each of the column portions 10. The configuration of the power supply portion 8 will be described later. The column portion 10 includes: a frequency conversion portion 101; a counter portion 103; and a memory portion 105. The frequency conversion portion 101 performs a frequency modulation in accordance with a signal from the image pickup portion 2 via the analog processing portion 7. The configuration of the frequency conversion portion 101 will be described later. The count portion 103 performs count processing of count pulses that are output from the frequency conversion portion 101. The memory portion 105 holds a value counted by the count portion 103.

It is desirable that the count portion 103 be configured using an asynchronous-type counter circuit, which is easy to control. However, the count portion 103 may be configured using a synchronous-type counter circuit. Note that the pixel signal that has been output from the image pickup portion 2 is expressed by a reference level such as a reset level and a real signal level which is superimposed on the reset level. Therefore, to extract the real signal level, it is required to perform difference processing between the reset level and the signal level.

It is possible to easily perform this difference processing by using an up/down counter having up-count mode and down-count mode as a counter circuit constituting the count portion 103. For example, when the reset level is read, up-count mode processing may be performed; and when the signal level is read, the count processing may be performed in down-count mode.

Alternatively, when the reset level is read, the count processing may be performed in down-count mode; and when the signal level is read, the count processing may be performed in up-count mode. Furthermore, the difference processing need not necessarily be performed in count portion 103. Therefore, the counter circuit constituting the count portion 103 is not limited to an up/down counter.

The vertical selection portion 12 and the horizontal selection portion 14 execute a selection operation in response to a drive pulse provided from the control portion 20. Note that, in each of the vertical control lines 11_1 to 11_4, a variety of pulses for driving the unit pixels 3 are included. Furthermore, although not shown in the figure, the vertical selection portion 12 is made of a vertical shift register or decoder for performing a basic control of the row from which a signal is read. The vertical selection portion 12 may have a shift register or a decoder which performs a row control for an electronic shutter. Similarly, the horizontal selection portion 14 has a horizontal shift register or decoder. The horizontal selection portion 14 has a function of a selection device that selects, in a predetermined order, pieces of data stored in the column circuits 10 constituting the A/D conversion portion 9, and outputs the selected pieces of pixel information to a horizontal signal line 15.

The control portion 20 controls the frequency conversion portion 101. Although not shown in the figure, the control portion 20 includes: a functional block of a TG (Timing Generator) which supplies pulses at predetermined intervals and clock pulses required for the operation of every portion; and a functional block which communicates with the TG.

The control portion 20 may be configured as a separate semiconductor integrated circuit independent of other functional elements such as the image pickup portion 2, the vertical selection portion 12, and the horizontal selection portion 14. In this case, an image pickup apparatus as one example of semiconductor system is constructed of: an image pickup device made of the image pickup portion 2, the vertical selection portion 12, the horizontal selection portion 14, and the like; and the control portion 20. The image pickup device may be configured as an image pickup module into which peripheral signal processing and power source circuits and the like are built.

The output portion 17 amplifies, with an appropriate gain, the pixel signals from the unit pixels 3 that have been output from the image pickup portion 2 via the horizontal signal line 15, and then outputs them as image pickup signals to an external circuit. The output portion 17 may include, for example, a signal processing function which performs black level adjustment, column variation correction, color processing, or the like when performing only buffering or before buffering. Furthermore, the output portion 17 may be configured so as to convert n-bit parallel digital data to serial data and output it. In this case, for example a multiply circuit such as a PLL (Phase Locked Loop) may be built into the solid-state image pickup apparatus 1.

Next is a description of the configuration of the power supply portion 8 and the frequency conversion portion 101 that are used in the solid-state image pickup apparatus in the present embodiment. First, a first specific example of the frequency conversion portion 101 and the power supply portion 8 will be described with reference to FIG. 4. In the example shown, the power supply portion 8 includes an NMOS transistor 81 and a PMOS transistor 82.

The frequency conversion portion 101 includes a VCO (Voltage Controlled Oscillator) made of an odd number of inversion circuits in which the delay amount varies in accordance with the intensity of a signal, the inversion circuits being linked in a ring. The VCO includes a NAND (negative AND) circuit 401 and inverter (INV) circuits 402 to 431. The NAND circuit 401 is a starter inversion circuit that operates on reception of a starter signal (StartP) at one input terminal and on reception of an output from an inverter circuit 431 in a previous stage at the other terminal. The inverter circuits 402 to 431 are inversion circuits. The NAND circuit 401 and the inverter circuits 402 to 431 are connected in series. The sum total of the NAND circuit 401 and the inverter circuits 402 to 431 is 31.

Each of the NAND circuit 401 and the inverter circuits 402 to 431 includes a first terminal and a second terminal. In the NAND circuit 401 and the inverter circuits 402 to 431, the delay time from the input signal to the output signal varies based on the voltage difference between the voltage supplied to the first terminal and the voltage supplied to the second terminal. To the first terminal is supplied a voltage Vdd in accordance with a signal voltage (Vin) from the NMOS transistor 81. To the second terminal is supplied a voltage Vss in accordance with a DC voltage (Vdc) from the PMOS transistor 82.

With the pulse signal StartP shifted from a Low state to a High state, the frequency conversion portion 101 starts an inversion operation. It continues the inversion operation during the time when the pulse signal StartP is in the High state. Furthermore, the delay time in the NAND circuit 401 and the inverter circuits 402 to 431 varies in accordance with the voltage difference $\Delta V=Vdd-Vss$ between the voltage Vdd supplied to the first terminal and the voltage Vss supplied to the second terminal. That is, the frequency conversion portion 101 controls the delay amount of inversion circuits by means of a voltage that is input to the inversion circuit, to thereby control the frequency of a signal circulating in the VCO.

Note that the sum total of the inverter circuits and the NAND circuit constituting the frequency conversion portion 101 is not limited to 31. No limitation is imposed so long as the number. The sum total of the inverter circuits and the NAND circuit may be an odd number of three or greater.

Figure 4:
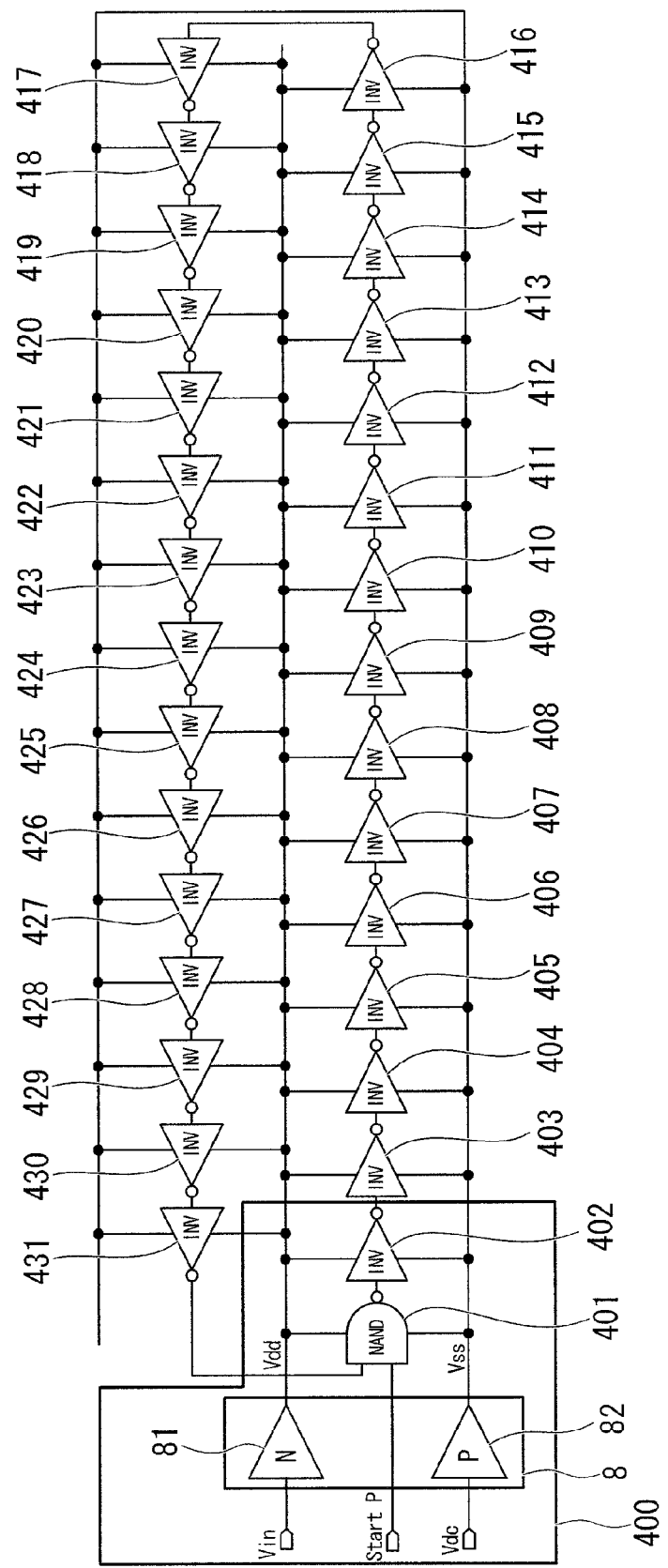
FIG. 4 is a circuit diagram showing a circuit of the power supply portion and the frequency conversion portion in the embodiment.
Figure 5:
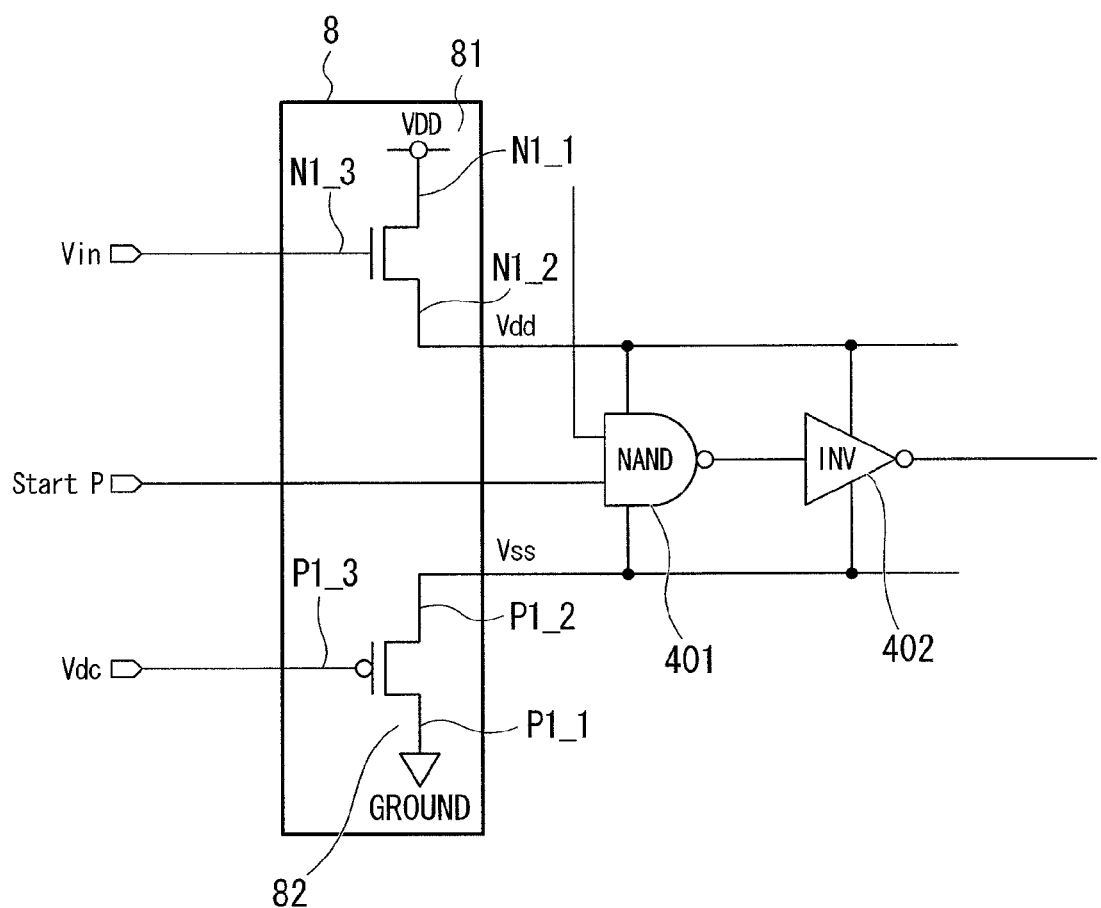
FIG. 5 is an elements on larger scale showing a part of the circuit of the power supply portion and the frequency conversion portion in the embodiment.

FIG. 5 is a first example of elements on larger scale showing a part (a portion denoted by reference numeral 400 in FIG. 4) of the power supply portion 8 and the frequency conversion portion 101 shown in FIG. 4. A drain terminal N1_1 (third terminal) of the NMOS transistor 81 is connected to a main power source VDD. A control terminal N1_3 (fifth terminal) is connected to a signal voltage (Vin).

A source terminal N1_2 (fourth terminal) is connected to the first terminals of the inversion circuits constituting the frequency conversion portion 101. A drain terminal P1_1 (sixth terminal) of the PMOS transistor 82 is connected to a ground voltage GND. A control terminal P1_3 (eighth terminal) is connected to a DC voltage (Vdc). A source terminal P1_2 (seventh terminal) is connected to the second terminals of the inversion circuits constituting the frequency conversion portion 101.

As a result, even if a noise is superimposed on the main power source VDD, it is possible to stably supply a voltage to the first terminals of the inversion circuits constituting the frequency conversion portion 101. Furthermore, even if a noise is superimposed on the ground GND, it is possible to stably supply a voltage to the second terminals of the inversion circuits constituting the frequency conversion portion 101. That is, according to the present embodiment, it is possible to implement a highly noise-resistant power source with an easy-to-build circuit configuration.

It is desirable that the threshold value of the NMOS transistor 81 be appropriately selected in accordance with a signal voltage (Vin). Furthermore, it is desirable that the threshold value of the PMOS transistor 82 be appropriately selected in accordance with the DC voltage (Vdc) or that the DC voltage (Vdc) be appropriately selected in accordance with the threshold value of the PMOS transistor 82. Furthermore, between the DC power source (Vdc) and the control terminal P1_3 of the PMOS transistor 82, a capacitor such as a sample-hold, or a (low consumption current) buffer circuit or a level-shift circuit may be provided. Furthermore, between the signal voltage (Vin) and the control terminal N1_3 of the NMOS transistor 81, a capacitor such as a sample-hold, or a (low consumption current) buffer circuit or a level-shift circuit may be provided.

Figure 6:
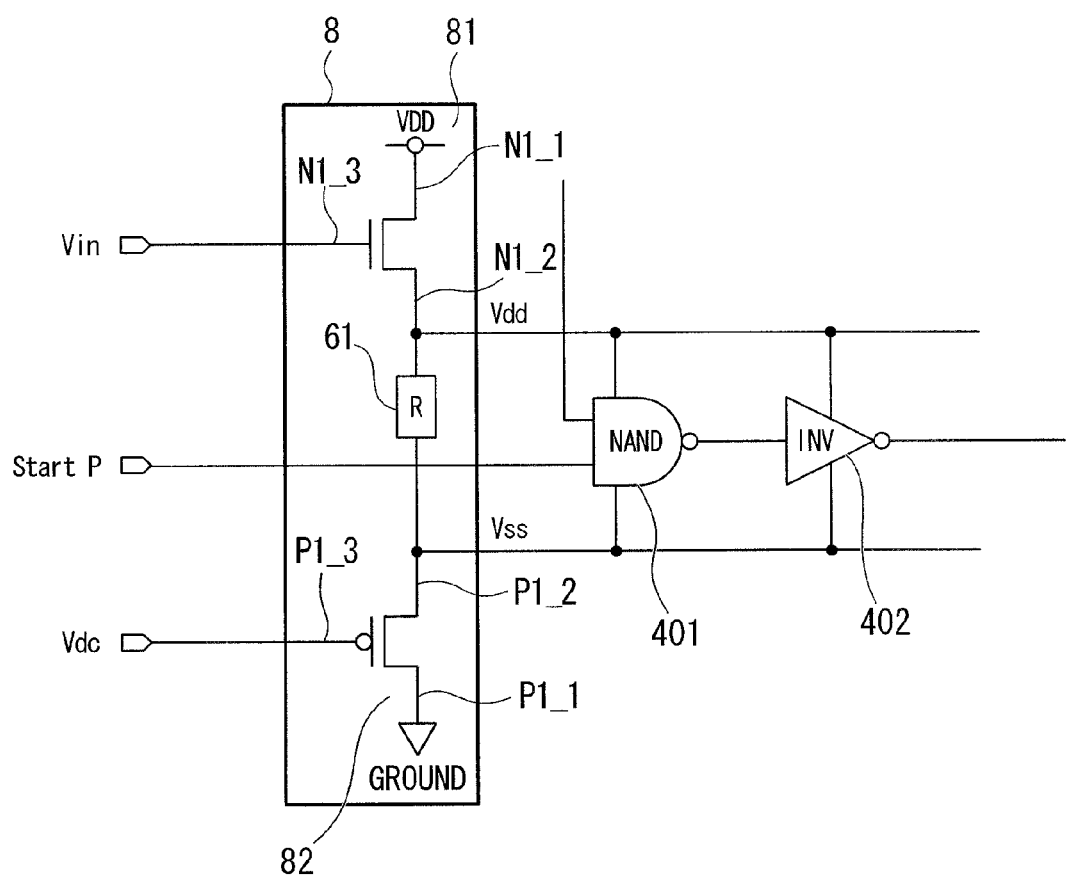
FIG. 6 is an elements on larger scale showing a part of the circuit of the power supply portion and the frequency conversion portion in the embodiment.

FIG. 6 is a second example of elements on larger scale showing a part (a portion denoted by reference numeral 400 in FIG. 4) of the power supply portion 8 and the frequency conversion portion 101 shown in FIG. 4. A difference in configuration from that shown in FIG. 5 lies in that a resistive element 61 is connected between the first terminal and the second terminal of the NAND circuit 401. For example, the resistive element 61 is a wiring resistance, a Poly resistance, or a diffusive resistance. Furthermore, it may be a resistance configured using a transistor such as a MOS transistor.

With this configuration, and in a state with a signal to be A/D-converted not being input to the frequency conversion portion 101, a small amount of electric current is fed through the frequency conversion portion 101. This makes it possible to make constant the state of the circuit in a state with a signal to be A/D-converted not being input to the frequency conversion portion 101. As a result, even immediately after a signal to be A/D-converted is input to the frequency conversion portion 101, the frequency conversion portion 101 is capable of operating in a state with a reduced influence of a noise or the like.

Figure 7:
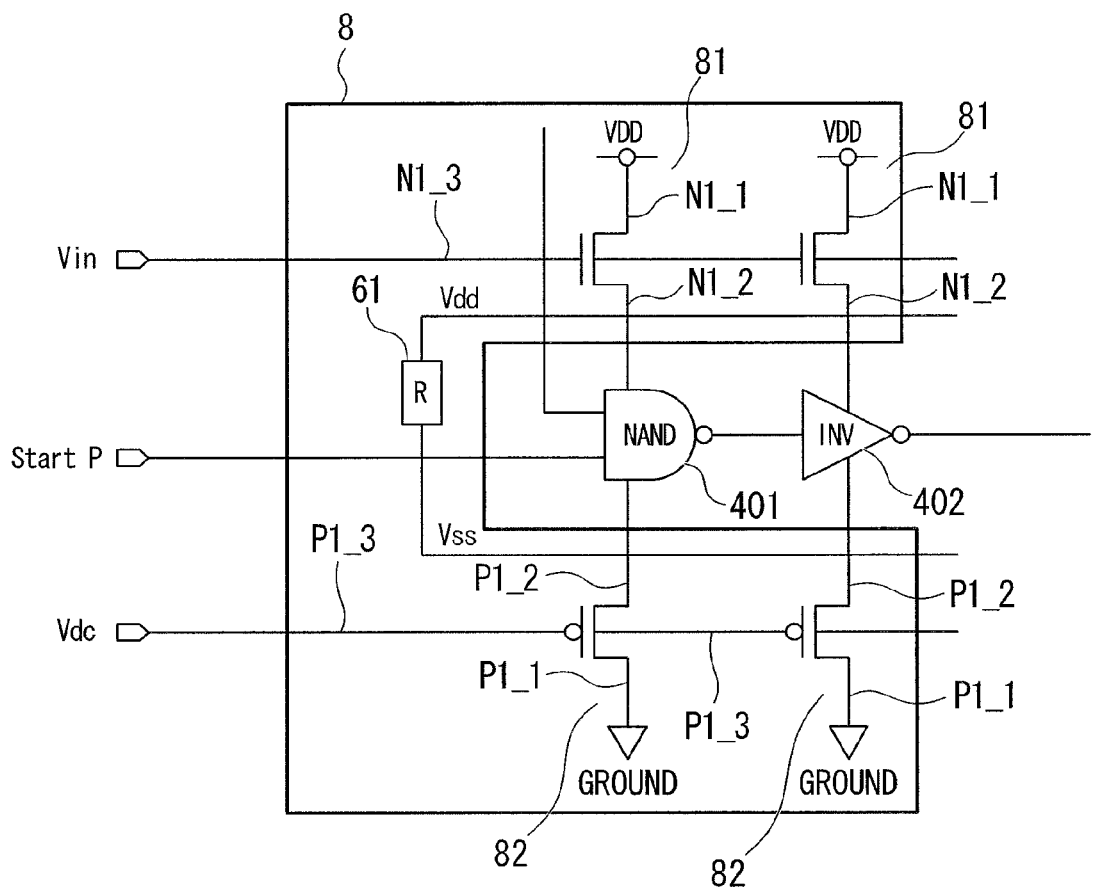
FIG. 7 is an elements on larger scale showing a part of the circuit of the power supply portion and the frequency conversion portion in the embodiment.

FIG. 7 is a third example of elements on larger scale showing a part (a portion denoted by reference numeral 400 in FIG. 4) of the power supply portion 8 and the frequency conversion portion 101 shown in FIG. 4. A difference in configuration from that shown in FIG. 6 lies in that an NMOS transistor 81 is connected between every first terminal of the inversion circuits constituting the frequency conversion portion 101 and the signal voltage (Vin). Another difference lies in that a PMOS transistor 82 is connected between every second terminal of the inversion circuits constituting the frequency conversion portion 101 and the DC power source (Vdc).

As a result, it is possible to provide the power supply portion 8 adjacent to the inversion circuits. This can shorten the distance between the power supply portion 8 and the inversion circuits. Therefore, it is possible to suppress a noise superimposed on the signal voltage (Vin) and the DC voltage (Vdc), the noise resulting from wiring or the like.

Figure 8:
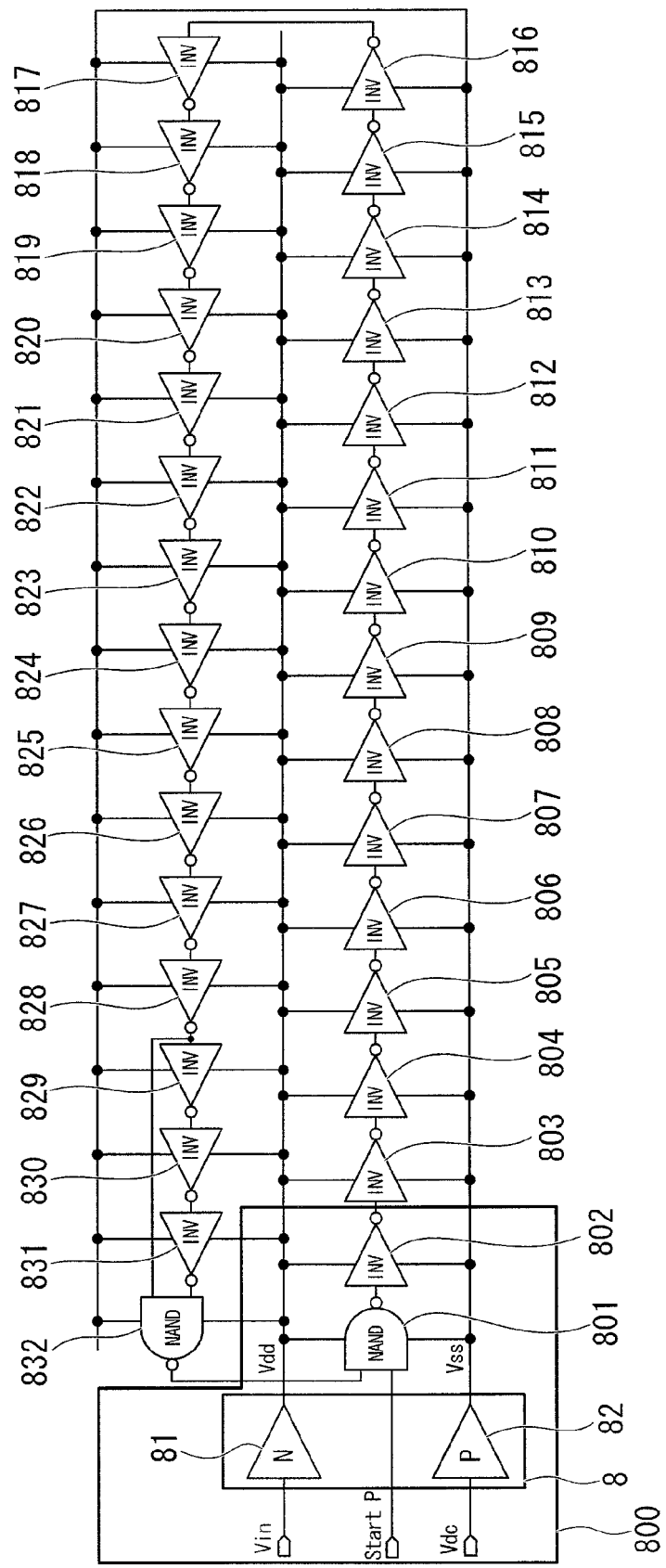
FIG. 8 is a circuit diagram showing a circuit of the power supply portion and the frequency conversion portion in the embodiment.

Next, a second specific example of frequency conversion portion 101 and power supply portion 8 will be described with reference to FIG. 8. A power supply portion 8 of FIG. 8 has a configuration similar to that of the power supply portion 8 shown in FIG. 4.

A frequency conversion portion 101 includes an RDL (Ring Delay Line) made of an even number of inversion circuits in which the delay amount varies in accordance with the intensity of a signal, the inversion circuits being linked in a ring. To be more specific, the frequency conversion portion 101 includes: a NAND (negative AND) circuit 801; inverter (INV) circuits 802 to 831; and a NAND circuit 832.

The NAND circuit 801 is a starter inversion circuit that operates on reception of a starter signal (StartP) at one input terminal and on reception of an output from a NAND circuit 832 in a previous stage at the other terminal. The inverter (INV) circuits 802 to 831 are inversion circuits. The NAND circuit 832 is configured so as to receive, at one input terminal, a signal identical to the signal that is input to the inverter circuit 829 as a feed forward loop. The NAND (negative AND) circuit 801, the inverter (INV) circuits 802 to 831, and the NAND circuit 832 are connected in series. The sum total of the NAND (negative AND) circuit 801, the inverter (INV) circuits 802 to 831, and the NAND circuit 832 is 32. The reason for providing the feed forward loop is to allow the outputs of the delay elements (the NAND circuits 801, 832 and the inverter circuits 802 to 831) to oscillate at frequencies in accordance with the delay time of the delay elements during the time when the pulse signal StartP is being input.

Each of the NAND circuits 801, 832 and the inverter circuits 802 to 831 includes a first terminal and a second terminal. In the NAND circuits 801, 832 and the inverter circuits 802 to 831, the delay time from the input signal to the output signal varies based on the voltage difference between the voltage supplied to the first terminal and the voltage supplied to the second terminal. To the first terminal is supplied a voltage Vdd in accordance with a signal voltage (Vin) from an NMOS transistor 81. To the second terminal is supplied a voltage Vss in accordance with a DC voltage (Vdc) from a PMOS transistor 82.

With the pulse signal StartP shifted from a Low state to a High state, the frequency conversion portion 101 starts an inversion operation. It continues the inversion operation during the time when the pulse signal StartP is in the High state. Furthermore, the delay time in the NAND circuits 801, 832 and the inverter circuits 802 to 831 varies in accordance with the voltage difference $\Delta V = Vdd - Vss$ between the voltage Vdd supplied to the first terminal and the voltage Vss supplied to the second terminal. That is, the frequency conversion portion 101 controls the delay amount of inversion circuits by means of a voltage that is input to the inversion circuit, to thereby control the frequency of a signal circulating in the RDL.

Note that the sum total of the inverter circuits and the NAND circuit constituting the frequency conversion portion 101 is not limited to 32. No limitation is imposed so long as the number. The sum total of the inverter circuits and the NAND circuit may be an even number of four or greater.

The power supply portion 8 in the second specific example is similar to the power supply portion 8 in the first specific example, and hence the configurations shown in FIG. 5 to FIG. 7 are applicable thereto. Therefore, it is possible for the frequency conversion portion 101 and the power supply portion 8 in the second specific example to have advantages similar to those of the frequency conversion portion 101 and the power supply portion 8 in the first specific example.

Next, a third specific example of frequency conversion portion 101 and power supply portion 8 will be described with reference to FIG. 9. A power supply portion 8 of FIG. 9 includes an NMOS transistor 81 and a PMOS transistor 82.

The frequency conversion portion 101 includes a VCO (Voltage Controlled Oscillator) made of an odd number of inversion circuits in which the delay amount varies in accordance with the intensity of a signal, the inversion circuits being linked in a ring. To be more specific, the VCO of the frequency conversion portion 101 includes a NAND (negative AND) circuit 901 and inverter (INV) circuits 902 to 931.

The NAND circuit 901 is a starter inversion circuit that operates on reception of a starter signal (StartP) at one input terminal and on reception of an output from an inverter circuit 931 in a previous stage at the other terminal. The inverter circuits 902 to 931 are inversion circuits. The NAND circuit 901 and the inverter circuits 902 to 931 are connected in series. The sum total of the NAND circuit 901 and the inverter circuits 902 to 931 is 31.

Each of the NAND circuit 901 and the inverter circuits 902 to 931 includes a first terminal and a second terminal. In the NAND circuit 901 and the inverter circuits 902 to 931, the delay time from the input signal to the output signal varies based on the voltage difference between the voltage supplied to the first terminal and the voltage supplied to the second terminal. To the first terminal is supplied a voltage Vdd in accordance with a DC voltage (Vdc) from the NMOS transistor 81. To the second terminal is supplied a voltage Vss in accordance with a signal voltage (Vin) from the PMOS transistor 82.

With the pulse signal StartP shifted from a Low state to a High state, the frequency conversion portion 101 starts an inversion operation. It continues the inversion operation during the time when the pulse signal StartP is in the High state. Furthermore, the delay time in the NAND circuit 901 and the inverter circuits 902 to 931 varies in accordance with the voltage difference $\Delta V = Vdd - Vss$ between the voltage Vdd supplied to the first terminal and the voltage Vss supplied to the second terminal. That is, the frequency conversion portion 101 controls the delay amount of inversion circuits by means of a voltage that is input to the inversion circuit, to thereby control the frequency of a signal circulating in the VCO.

Note that the sum total of the inverter circuits and the NAND circuit constituting the frequency conversion portion 101 is not limited to 31. No limitation is imposed so long as the number. The sum total of the inverter circuits and the NAND circuit may be an odd number of three or greater.

Figure 9:
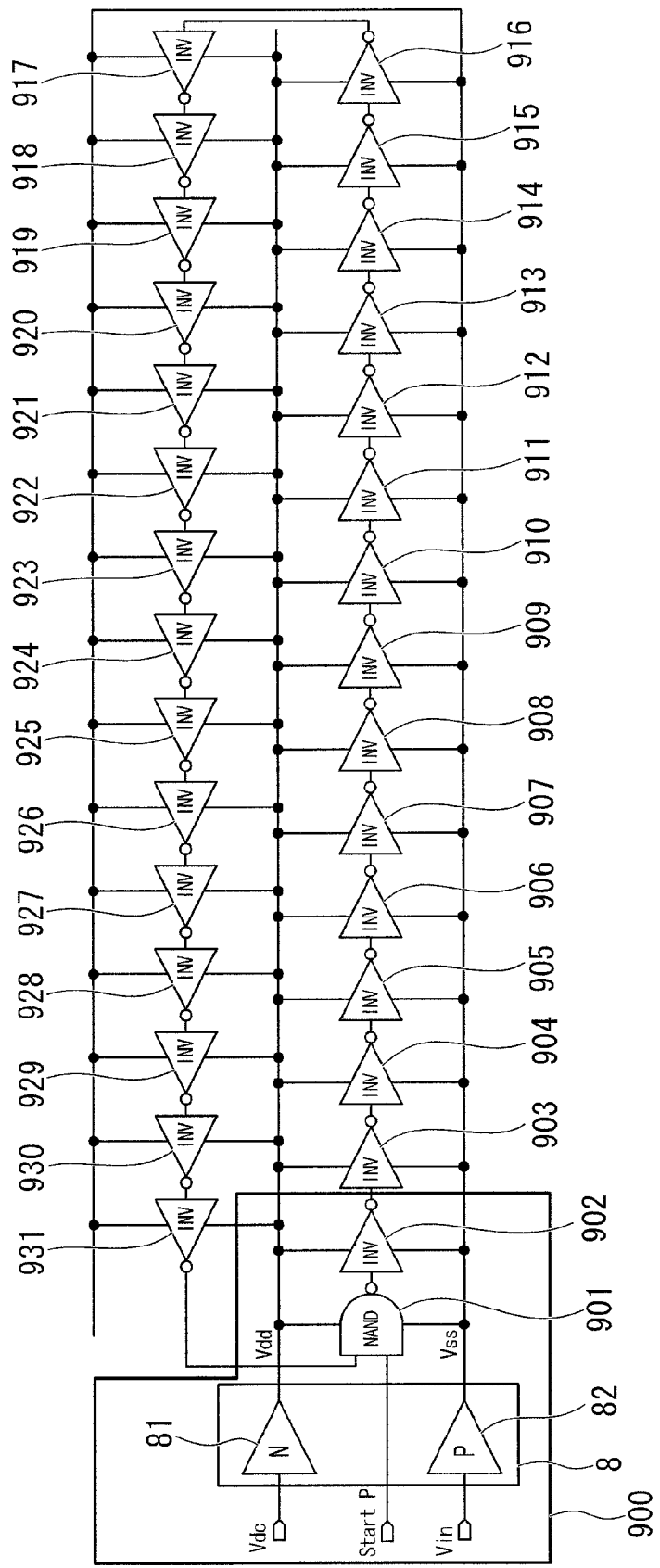
FIG. 9 is a circuit diagram showing a circuit of the power supply portion and the frequency conversion portion in the embodiment.
Figure 10:
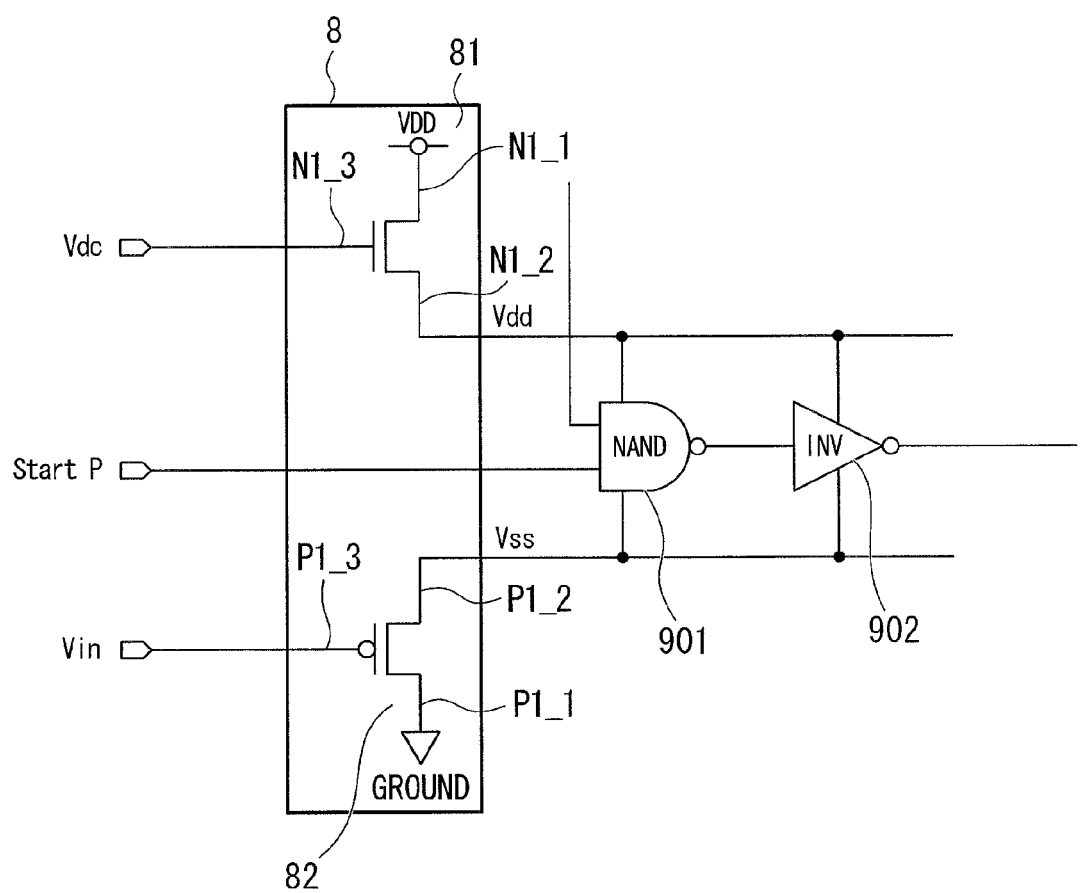
FIG. 10 is an elements on larger scale showing a part of the circuit of the power supply portion and the frequency conversion portion in the embodiment.

FIG. 10 is a first example of elements on larger scale showing a part (a portion denoted by reference numeral 900 in FIG. 9) of the power supply portion 8 and the frequency conversion portion 101 shown in FIG. 9. In the example shown, a drain terminal N1_1 of the NMOS transistor 81 is connected to a main power source VDD. A control terminal N1_3 is connected to a DC voltage (Vdc). A source terminal N1_2 is connected to the first terminals of the inversion circuits constituting the frequency conversion portion 101. A drain terminal P1_1 of the PMOS transistor 82 is connected to a ground voltage GND. A control terminal P1_3 is connected to a signal voltage (Vin). A source terminal P1_2 is connected to the second terminals of the inversion circuits constituting the frequency conversion portion 101.

As a result, even if a noise is superimposed on the main power source VDD, it is possible to stably supply a voltage to the first terminals of the inversion circuits constituting the frequency conversion portion 101. Furthermore, even if a noise is superimposed on the ground GND, it is possible to stably supply a voltage to the second terminals of the inversion circuits constituting the frequency conversion portion 101. That is, according to the present embodiment, it is possible to implement a highly noise-resistant power source with an easy-to-build circuit configuration.

It is desirable that the threshold value of the PMOS transistor 82 be appropriately selected in accordance with a signal voltage (Vin). Furthermore, it is desirable that the threshold value of the NMOS transistor 81 be appropriately selected in accordance with the DC voltage (Vdc) or that the DC voltage (Vdc) be appropriately selected in accordance with the threshold value of the NMOS transistor 81. Furthermore, between the signal voltage (Vin) and the control terminal P1_3 of the PMOS transistor 82, a capacitor such as a sample-hold, or a (low consumption current) buffer circuit or a level-shift circuit may be provided. Furthermore, between the DC voltage (Vdc) and the control terminal N1_3 of the NMOS transistor 81, a capacitor such as a sample-hold, or a (low consumption current) buffer circuit or a level-shift circuit may be provided.

Figure 11:
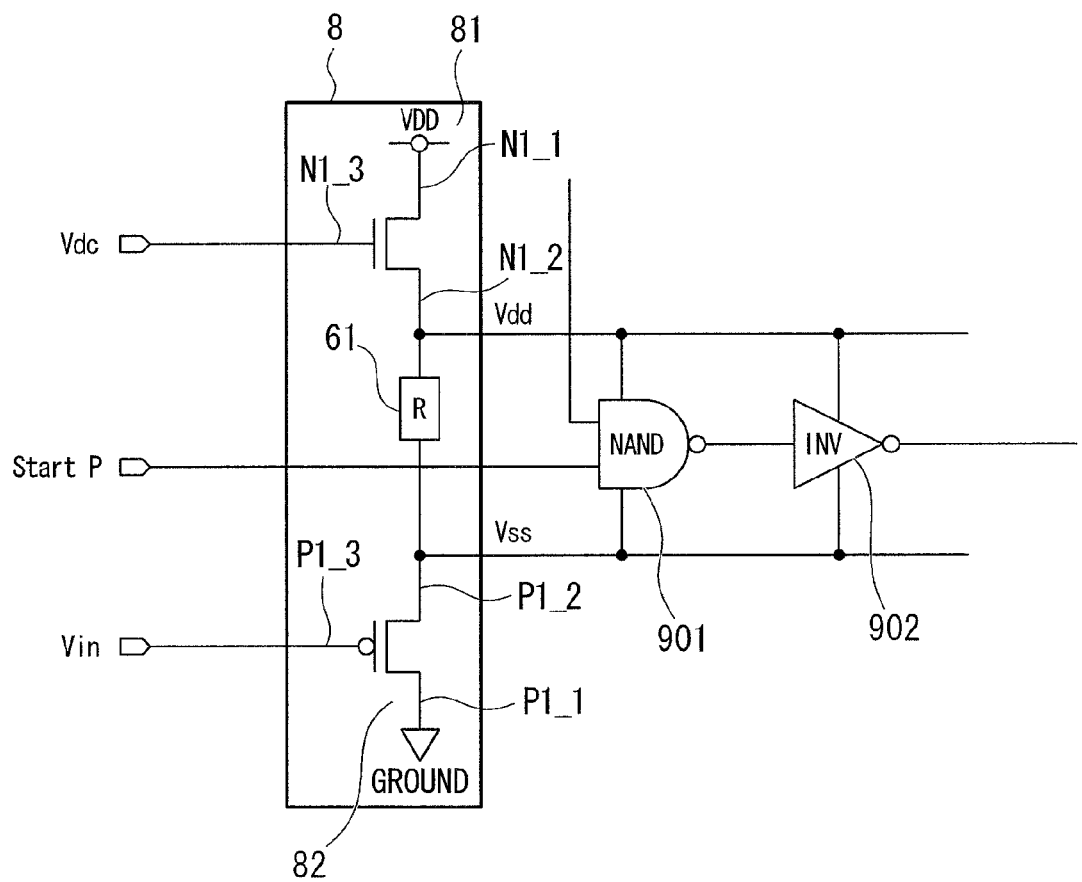
FIG. 11 is an elements on larger scale showing a part of the circuit of the power supply portion and the frequency conversion portion in the embodiment.

FIG. 11 is a second example of elements on larger scale showing a part (a portion denoted by reference numeral 900 in FIG. 9) of the power supply portion 8 and the frequency conversion portion 101 shown in FIG. 9. A difference in configuration from that shown in FIG. 10 lies in that a resistive element 61 is connected between the first terminal and the second terminal of the NAND circuit 901. For example, the resistive element 61 is a wiring resistance, a Poly resistance, or a diffusive resistance. Furthermore, it may be a resistance configured using a transistor such as a MOS transistor.

With this configuration, and in a state with a signal to be A/D-converted not being input to the frequency conversion portion 101, a small amount of electric current is fed through the frequency conversion portion 101. This makes it possible to make constant the state of the circuit in a state with a signal to be A/D-converted not being input to the frequency conversion portion 101. As a result, even immediately after a signal to be A/D-converted is input to the frequency conversion portion 101, the frequency conversion portion 101 is capable of operating in a state with a reduced influence of a noise or the like.

Figure 12:
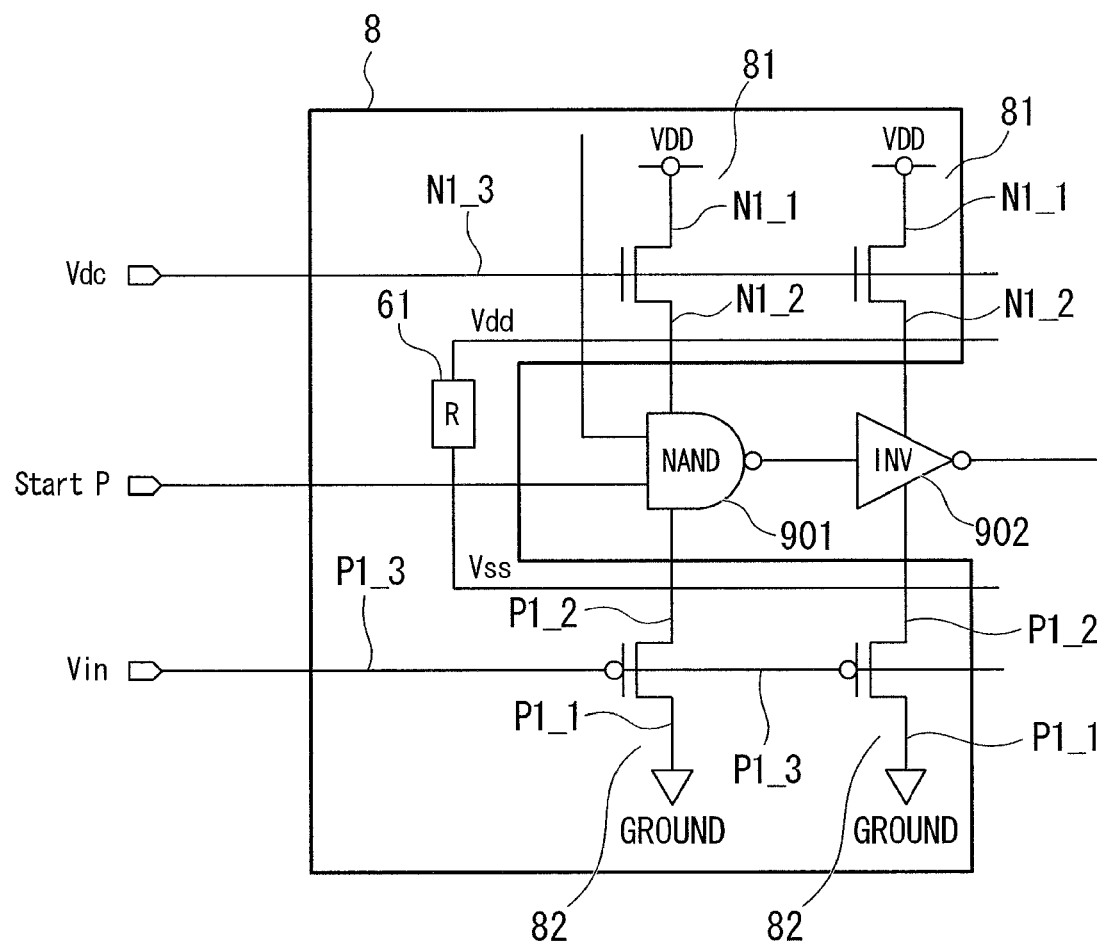
FIG. 12 is an elements on larger scale showing a part of the circuit of the power supply portion and the frequency conversion portion in the embodiment.

FIG. 12 is a third example of elements on larger scale showing a part (a portion of reference numeral 900 in FIG. 9) of the power supply portion 8 and the frequency conversion portion 101 shown in FIG. 9. A difference in configuration from that shown in FIG. 11 lies in that an NMOS transistor 81 is connected between every first terminal of the inversion circuits constituting the frequency conversion portion 101 and the DC voltage (Vdc). Another difference lies in that a PMOS transistor 82 is connected between every second terminal of the inversion circuits constituting the frequency conversion portion 101 and the signal voltage (Vin).

As a result, it is possible to provide the power supply portion 8 adjacent to the inversion circuits. This can shorten the distance between the power supply portion 8 and the inversion circuits. Therefore, it is possible to suppress a noise superimposed on the signal voltage (Vin) and the DC voltage (Vdc), the noise resulting from wiring or the like.

Figure 13:
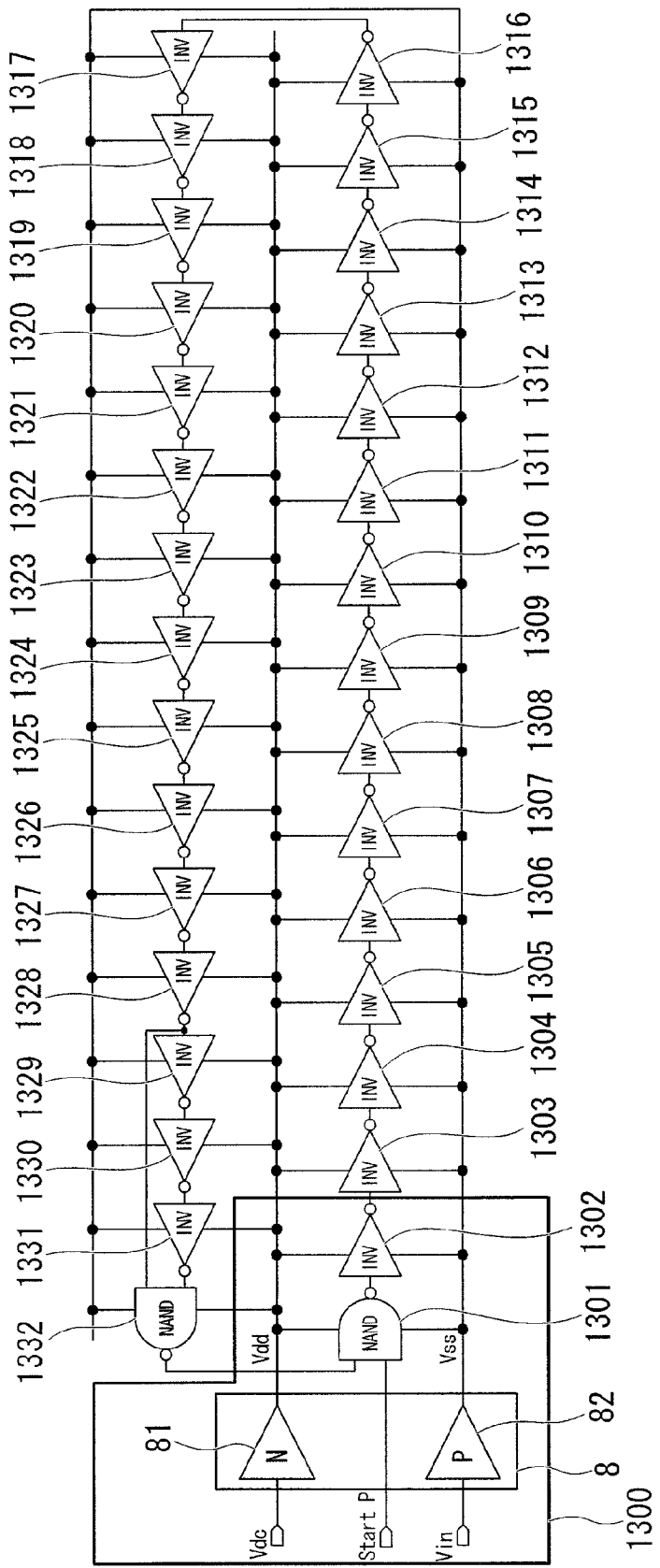
FIG. 13 is a circuit diagram showing a circuit of the power supply portion and the frequency conversion portion in the embodiment.

Next, a fourth specific example of frequency conversion portion 101 and power supply portion 8 will be described with reference to FIG. 13. In the example shown, the power supply portion 8 has a configuration similar to that of the power supply portion 8 shown in FIG. 9.

A frequency conversion portion 101 includes an RDL (Ring Delay Line) made of an even number of inversion circuits in which the delay amount varies in accordance with the intensity of a signal, the inversion circuits being linked in a ring. To be more specific, the frequency conversion portion 101 includes: a NAND (negative AND) circuit 1301; inverter (INV) circuits 1302 to 1331; and a NAND circuit 1332.

The NAND circuit 1301 is a starter inversion circuit that operates on reception of a starter signal (StartP) at one input terminal and on reception of an output from a NAND circuit 1332 in a previous stage at the other terminal. The inverter circuits 1302 to 1331 are inversion circuits. The NAND circuit 1332 is configured so as to receive, at one input terminal, a signal identical to the signal that is input to the inverter circuit 1329 as a feed forward loop. The NAND circuit 1301, the inverter circuits 1302 to 1331, and the NAND circuit 1332 are connected in series. The sum total of the NAND circuit 1301, the inverter circuits 1302 to 1331, and the NAND circuit 1332 is 32. The reason for providing the feed forward loop is to allow the outputs of the delay elements (the NAND circuits 1301, 1332 and the inverter circuits 1302 to 1331) to oscillate at frequencies in accordance with the delay time of the delay elements during the time when the pulse signal StartP is being input.

Each of the NAND circuits 1301, 1332 and the inverter circuits 1302 to 1331 includes a first terminal and a second terminal. In the NAND circuits 1301, 1332 and the inverter circuits 1302 to 1331, the delay time from the input signal to the output signal varies based on the voltage difference between the voltage supplied to the first terminal and the voltage supplied to the second terminal. To the first terminal is supplied a voltage Vdd in accordance with a DC voltage (Vdc) from the NMOS transistor 81. To the second terminal is supplied a voltage Vss in accordance with a signal voltage (Vin) from the PMOS transistor 82.

With the pulse signal StartP shifted from a Low state to a High state, the frequency conversion portion 101 starts an inversion operation. It continues the inversion operation during the time when the pulse signal StartP is in the High state. Furthermore, the delay time in the NAND circuits 1301, 1332 and the inverter circuits 1302 to 1331 varies in accordance with the voltage difference $\Delta V = Vdd - Vss$ between the voltage Vdd supplied to the first terminal and the voltage Vss supplied to the second terminal. That is, the frequency conversion portion 101 controls the delay amount of inversion circuits by means of a voltage that is input to the inversion circuit, to thereby control the frequency of a signal circulating in the RDL.

Note that the total number of inverter circuits and NAND circuits constituting the frequency conversion portion 101 is not limited to 32. No limitation is imposed so long as the number. The sum total of the inverter circuits and the NAND circuit may be an even number of four or greater.

The power supply portion 8 in the fourth specific example is similar to the power supply portion 8 in the third specific example, and hence the configurations shown in FIG. 10 to FIG. 12 are applicable thereto. Therefore, it is possible for the frequency conversion portion 101 and the power supply portion 8 in the fourth specific example to have advantages similar to those of the frequency conversion portion 101 and the power supply portion 8 in the third specific example.

The solid-state image pickup apparatus 1 according to the present embodiment includes an image pickup portion 2 in which are arranged a plurality of pixels with a photo-electric conversion element, the pixels generating and outputting a signal in accordance with the intensity of an incident electromagnetic wave (FIG. 1). The solid-state image pickup apparatus 1 further includes a frequency conversion portion 101 including a link circuit in which a plurality of inversion circuits with a first terminal and a second terminal are linked in a ring, each of the inversion circuits having a varying delay time from an input signal to an output signal based on the voltage difference between the voltage supplied to the first terminal and the voltage supplied to the second terminal, and the frequency conversion portion 101 generating clock pulses at a frequency based on the voltage difference (FIG. 1). The solid-state image pickup apparatus 1 further includes a count portion 103 which counts the clock pulses generated by the frequency conversion portion 101 (FIG. 1). The solid-state image pickup apparatus 1 includes a power supply portion 8 that includes a transistor including: a drain terminal N1_1 (third terminal) to which is input a predetermined voltage; a source terminal N1_2 (fourth terminal) connected to the first terminals; and a control terminal N1_3 (fifth terminal) to which are input signals from the pixels 3, the transistor controlling a current that is passed between the drain terminal N1_1 (third terminal) and the source terminal N1_2 (fourth terminal) based on a signal that is input to the control terminal N1_3 (fifth terminal) (FIG. 5).

As a result, even if a noise is superimposed on the predetermined voltage that is input to the drain terminal N1_1 (third terminal), it is possible to stably supply a voltage to the frequency conversion portion 101. Therefore, it is possible to implement a highly noise-resistant power source with an easy-to-build circuit configuration.

The solid-state image pickup apparatus 1 according to the present embodiment may further include a PMOS transistor (second transistor) including: a drain terminal P1_1 (sixth terminal) to which is input a second predetermined voltage different from the predetermined voltage; a source terminal P1_2 (seventh terminal) connected to the second terminals; and a control terminal P1_3 (eighth terminal) to which is input the second predetermined voltage or a third predetermined voltage different from the second voltage, the PMOS transistor controlling a current that is passed between the drain terminal P1_1 (sixth terminal) and the source terminal P1_2 (seventh terminal) based on the voltage that is input to the control terminal P1_3 (eighth terminal) (FIG. 5).

As a result, even if a noise is superimposed on the second predetermined voltage that is input to the drain terminal P1_1 (sixth terminal), it is possible to stably supply a voltage to the frequency conversion portion 101. Therefore, it is possible to implement a highly noise-resistant power source with an easy-to-build circuit configuration.

In the solid-state image pickup apparatus 1 according to the present embodiment, a resistive element 61 may be provided between the first terminals and the second terminals (FIG. 6).

As a result, it is possible to make constant the state of the circuit of the frequency conversion portion without depending on an operational state of the frequency conversion portion 101.

While an embodiment of the present invention has been described above in detail with reference to the drawings, the specific configuration thereof is not limited to this embodiment. Designs and the like without departing from the spirit or scope of this invention are also included.

What is claimed is:

1. A solid-state image pickup apparatus comprising:
an image pickup portion in which are arranged a plurality of pixels with a photo-electric conversion element, the pixels which generate and output a signal in accordance with the intensity of an incident electromagnetic wave;
a frequency conversion portion that comprises a link circuit in which a plurality of inversion circuits with a first terminal and a second terminal are linked in a ring, each of the inversion circuits having a varying delay time from an input signal to an output signal based on the voltage difference between the voltage supplied to the first terminal and the voltage supplied to the second terminal, and the frequency conversion portion which generates clock pulses at a frequency based on the voltage difference;
a count portion which counts the clock pulses generated by the frequency conversion portion; and
a transistor comprising: a third terminal to which is input a predetermined voltage; a fourth terminal connected to the first terminals; and a fifth terminal to which are input signals from the pixels, the transistor controlling a current that is passed between the third terminal and the fourth terminal based on a signal that is input to the fifth terminal.

2. The solid-state image pickup apparatus according to claim 1, further comprising:
a second transistor comprising: a sixth terminal to which is input a second predetermined voltage different from the predetermined voltage; a seventh terminal connected to the second terminals; and an eighth terminal to which is input the second predetermined voltage or a third predetermined voltage different from the second voltage, the second transistor controlling a current that is passed between the sixth terminal and the seventh terminal based on the voltage that is input to the eighth terminal.

3. The solid-state image pickup apparatus according to claim 2, wherein
a resistive element is provided between the first terminals and the second terminals.

* * * * *